United States Patent
Mueller et al.

(10) Patent No.: US 12,132,382 B2
(45) Date of Patent: Oct. 29, 2024

(54) ELECTRICAL MACHINE WITH HEAT SINKS WHICH ARE SEPARATED FROM ONE ANOTHER

(71) Applicant: Robert Bosch GmbH, Stuttgart (DE)

(72) Inventors: Hans-Peter Mueller, Reutlingen (DE); Thomas Hessler, Lichtenstein (DE); Joerg Moessner, Wannweil (DE)

(73) Assignee: Robert Bosch GmbH, Stuttgart (DE)

( * ) Notice: Subject to any disclaimer, the term of this patent is extended or adjusted under 35 U.S.C. 154(b) by 667 days.

(21) Appl. No.: 17/413,226

(22) PCT Filed: Nov. 29, 2019

(86) PCT No.: PCT/EP2019/083174
§ 371 (c)(1),
(2) Date: Jan. 4, 2022

(87) PCT Pub. No.: WO2020/120178
PCT Pub. Date: Jun. 18, 2020

(65) Prior Publication Data
US 2022/0131447 A1    Apr. 28, 2022

(30) Foreign Application Priority Data
Dec. 14, 2018  (DE) ................. 10 2018 221 762.9

(51) Int. Cl.
*H02K 9/22* (2006.01)
*H02K 5/15* (2006.01)
(Continued)

(52) U.S. Cl.
CPC .............. *H02K 9/227* (2021.01); *H02K 5/15* (2013.01); *H02K 5/225* (2013.01); *H02K 9/223* (2021.01); *H02K 11/33* (2016.01)

(58) Field of Classification Search
CPC ...... H02K 11/215; H02K 11/33; H02K 21/14; H02K 29/06; H02K 5/15; H02K 5/161;
(Continued)

(56) References Cited

U.S. PATENT DOCUMENTS 5,285,699 A * 2/1994 Walls .................. B29C 66/5221
74/572.12
7,166,984 B1 * 1/2007 Jones ..................... H02K 17/12
318/400.23
(Continued)

FOREIGN PATENT DOCUMENTS

CN 103326492 A 9/2013
CN 103701250 A 4/2014
(Continued)

OTHER PUBLICATIONS

FR-2711281-A1, Davoigneau D, all pages (Year: 1995).*
(Continued)

*Primary Examiner* — Naishadh N Desai
(74) *Attorney, Agent, or Firm* — Maginot, Moore & Beck LLP

(57) ABSTRACT

An electrical machine, in particular an electronically commutated machine, includes a housing and a controller accommodated in the housing. The controller is configured to drive the machine to generate a magnetic rotating field. The housing has a housing cup, which surrounds a hollow space, and a housing cover. The machine has an end plate accommodated in the housing cup. The end plate is thermally conductively connected to the housing cup. The machine also has a cooling panel thermally conductively connected to the housing cup and to at least one component, or to a plurality of components, of the control unit. The machine has an inverter comprising semiconductor switches. The semiconductor switches are thermally con-
(Continued)

ductively connected to the end plate. The end plate and the cooling panel enclose a portion of the hollow space.

10 Claims, 2 Drawing Sheets

(51) Int. Cl.
*H02K 5/22* (2006.01)
*H02K 11/33* (2016.01)

(58) Field of Classification Search
CPC ........ H02K 5/225; H02K 9/223; H02K 9/227; H02K 9/22
See application file for complete search history.

(56) References Cited

U.S. PATENT DOCUMENTS

| | | | | |
|---|---|---|---|---|
| 2014/0015357 | A1* | 1/2014 | Randolph | H01R 4/185 310/71 |
| 2017/0349206 | A1* | 12/2017 | Asao | H02K 5/225 |
| 2018/0026492 | A1 | 1/2018 | Takizawa et al. | |
| 2018/0219450 | A1* | 8/2018 | Yamamoto | B62D 5/0406 |
| 2018/0254685 | A1* | 9/2018 | Seki | F04C 13/001 |
| 2018/0375401 | A1* | 12/2018 | Stefani | H02K 11/21 |

FOREIGN PATENT DOCUMENTS

| | | | | |
|---|---|---|---|---|
| CN | 104600896 | A | 5/2015 | |
| CN | 107249965 | A | 10/2017 | |
| CN | 107592955 | A | 1/2018 | |
| CN | 108377080 | A | 8/2018 | |
| EP | 2 905 876 | A1 | 8/2015 | |
| EP | 3 900 169 | | 6/2020 | |
| FR | 2711281 | A1 * | 4/1995 | ............... H02K 5/20 |
| JP | 2013-201804 | A | 10/2013 | |
| JP | 2014-68496 | A | 4/2014 | |
| JP | 2015-89215 | A | 5/2015 | |
| JP | 2016-132474 | A | 7/2016 | |
| JP | 2016-208766 | A | 12/2016 | |
| JP | 2018-82514 | A | 5/2018 | |
| JP | 2018-122665 | A | 8/2018 | |
| JP | 2018-196193 | A | 12/2018 | |
| WO | 2015/186455 | A1 | 12/2015 | |
| WO | 2017/175325 | A1 | 10/2017 | |

OTHER PUBLICATIONS

International Search Report corresponding to PCT Application No. PCT/EP2019/083174, mailed Feb. 13, 2020 (German and English language document) (5 pages).

* cited by examiner

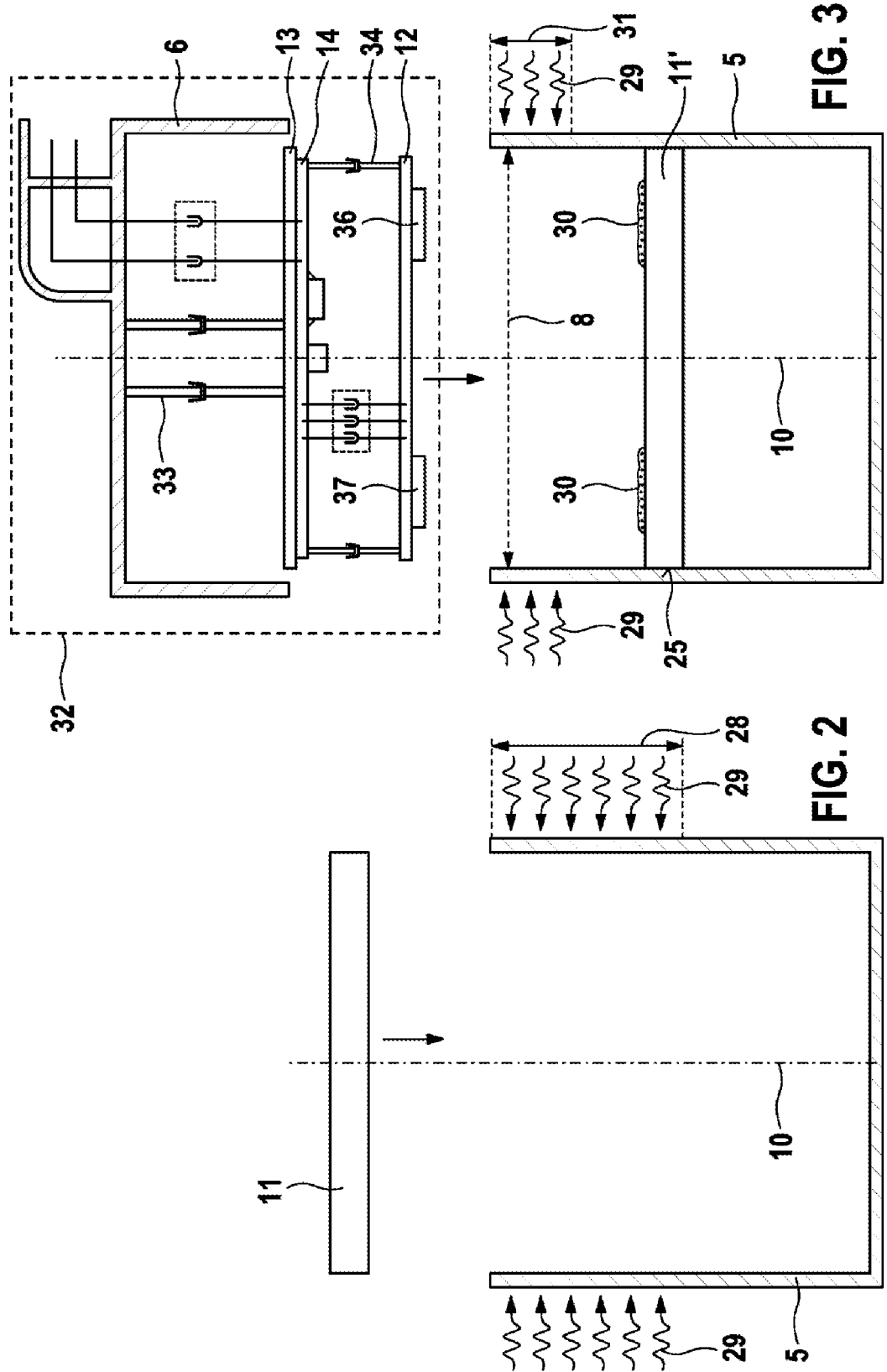

ELECTRICAL MACHINE WITH HEAT SINKS WHICH ARE SEPARATED FROM ONE ANOTHER

This application is a 35 U.S.C. § 371 National Stage Application of PCT/EP2019/083174, filed on Nov. 29, 2019, which claims the benefit of priority to Serial No. DE 10 2018 221 762.9, filed on Dec. 14, 2018 in Germany, the disclosures of which are incorporated herein by reference in their entirety.

BACKGROUND

The disclosure relates to an electrical machine, in particular an electronically commutated machine. The machine has a housing, and a controller that is accommodated in the housing. The controller is designed to control the machine to generate a rotating magnetic field.

SUMMARY

According to the disclosure, the housing has a housing cup that encloses a cavity, and has a housing cover. The machine has an end plate accommodated in the housing cup, wherein the end plate is connected in a thermally conductive manner to the housing cup. The machine also has a cooling plate that is connected in a thermally conductive manner to the housing cup and to at least one component, or a plurality of components, of the control unit. The machine has an inverter comprising semiconductor switches, wherein the semiconductor switches are connected in a thermally conductive manner to the end plate. The end plate and the cooling plate enclose between them a portion of the cavity, wherein the control unit and the inverter are accommodated in the portion of the cavity. The components of the control unit, in particular electronic components such as integrated circuits, capacitors or resistors, thus preferably project into the cavity formed between the cooling plate and the end plate. The semiconductor switches of the inverter likewise project into the thus formed cavity, such that the machine can be formed in a particularly economical and compact manner. Advantageously, the components of the control unit and the semiconductor switches of the inverter can thus be cooled independently of one another. Advantageously, mutually different temperature levels can thus be generated at the mutually different heat sinks, such that—compared to a common heat sink for the semiconductors of the control unit and the semiconductors of the inverter—the heat loss from a component having a lower temperature than the other heat sink can still dissipate unhindered.

In a preferred embodiment, the control unit and the inverter are each electrically connected to one another by means of at least one plug-in contact, in particular separately for each phase. Advantageously, the control unit, for example comprising a printed circuit board, can be inserted together with the cooling plate, as a compact assembly, into the housing cup and connected to the inverter by means of the plug-in contacts. The plug-in contacts are preferably each realized as insulation-displacement contacts. Advantageously, a cold-weld connection can be created in this way.

In a preferred embodiment, the cooling plate is shrink-fitted into the housing cup, wherein an end face of the cooling plate is connected in a thermally conductive manner to a housing-cup wall of the housing cup by means of a press connection produced thus. Advantageously, a non-positive connection can thus be realized between the cooling plate and the housing-cup wall. The machine can thus be produced at low cost. For this purpose, for example, the housing cup may be heated, up to a housing-cup rim in a region in which the cooling plate is to be connected to the housing cup, such that a diameter of the housing cup is enlarged by the heating. With the housing cup in this enlarged state, the cooling plate, which is preferably already to the control unit, in particular to a circuit carrier comprising the control unit, can be inserted into the cavity of the housing cup. After the housing cup has cooled down, the housing-cup wall shrinks onto the end face of the cooling plate, such that the cooling plate is fixedly connected to the casing cup in a non-positive manner by means of an interference fit formed in this way.

In a preferred embodiment, the housing cover is plug-connected to the cooling plate by means of a plug-in connection and/or connected in a latching manner by means of a latching connection. The control unit can thus advantageously be inserted into the cavity as a pre-assembled assembly, together with the housing cover, upon closure of the housing opening. Further preferably, upon insertion of the control unit during closure of the housing cup opening, the control unit can be electrically connected to the inverter.

For the purpose of latching connection to the housing cup, the housing cover may have, for example, a latching lug that is designed to engage in a positive manner in a corresponding recess of the housing cup and to be latched there.

In a preferred embodiment, the housing cover has an outward-facing plug-in terminal, wherein plug-in contacts of the plug-in terminal are electrically connected to the control unit. The aforementioned components of the assembly, comprising the housing cover and the control unit with the cooling plate, may be plugged, screwed or soldered together to create the pre-assembled assembly.

In a preferred embodiment, the cooling plate has projection regions on the end face and contacts the housing-cup wall with the projection regions, in particular by pressing against it. In this embodiment, the cooling plate can advantageously be pressed into the housing cup. The cooling plate thus advantageously does not need to be shrink-fitted into the housing cup—as described above—such that the control unit can be easily connected to the housing cup by simple pressing of the cooling plate into the housing cup.

In a preferred embodiment, the housing cup, the cooling plate and the control unit are connected to each other, in particular rigidly, and together form an assembly that can be connected to the housing cup, in particular separably. The machine can thus be provided at particularly low cost by plugging or pressing the assembly into the housing cup.

In a preferred embodiment, the inverter is mechanically and electrically connected to the control unit and/or to the cooling plate and is part of the assembly. Advantageously, the inverter, in particular the semiconductor switches of the inverter, can thus also be connected to the housing cup together with the control unit. Electrical terminals, in particular output terminals of the inverter, for example phase terminals of the inverter, that are connected to stator coils of a stator of the machine, can be connected to the terminals of the stator coils by means of a plug-in connection upon insertion of the assembly into the housing cup.

The semiconductor switches of the inverter may be connected to the end plate of the machine by a heat-conducting compound—for example by dispensing—in order to create the thermally conductive connection, wherein, following insertion of the assembly into the cavity, the semiconductor switches of the inverter are pressed onto the end plate, such that a thermally conductive layer, formed by the heat-conducting compound, is formed between the end plate and the semiconductor switches. The heat-conducting compound is, for example, a heat-conducting paste or a particle-filled resin. The particle-filled resin, in particular filled with ceramic particles, may be cured, for example, by means of ultraviolet rays after the components of the machine have been joined together. For this purpose, the housing cup may have, for example, an opening through which an ultraviolet radiation source can be introduced into the cavity in the region of the thermally conductive connection.

The disclosure also relates to a method for producing an electrical machine, wherein the machine has a housing cup and a housing cover that is designed to close a housing opening of the housing cup. In the method, in one step an end plate is inserted into the housing cup and is positively and/or non-positively connected to the housing cup in a thermally conductive manner.

In a further step, a cooling plate, with a control unit and an inverter connected to the control unit, is inserted into the housing cup in such a manner that semiconductor switches of the inverter are connected to the end plate in a thermally conductive manner. In the process, or in a further step, the cooling plate—extending parallel to the end plate—is non-positively and/or positively connected in the housing cup in a thermally conductive manner. The thermally conductive connection is preferably produced by an interference fit.

In a preferred variant of the method, the control unit, the cooling plate and the inverter form an assembly that is connected, in particular rigidly to the housing cover, such that, upon insertion of the assembly into the housing cup, the housing opening is closed. In this way, advantageously, the machine can be provided at low cost.

Preferably, upon insertion of the assembly into the housing cup, the cooling plate is non-positively connected to the housing cup by pressing-in or shrink-fitting. It is thereby possible, advantageously, to produce a good transfer of heat from the cooling plate to the housing cup.

BRIEF DESCRIPTION OF THE DRAWING

The disclosure is now described in the following on the basis of figures and further exemplary embodiments. Further advantageous embodiment variants are obtained from a combination of the features described in the dependent claims and in the figures.

FIG. 2 shows an exemplary embodiment of a method for producing a machine, in which electrical components of the machine are assembled prior to being inserted into a housing cup of the machine, and are then inserted as a compact assembly into the housing cup, thereby enabling the housing cup to be closed;

FIG. 3 shows an exemplary embodiment of a method for producing a machine, in which a pre-assembled assembly, comprising a housing cover, a control unit and an inverter, are connected to a housing cup, and an opening of the housing cup is thereby closed.

DETAILED DESCRIPTION

Figure 1:
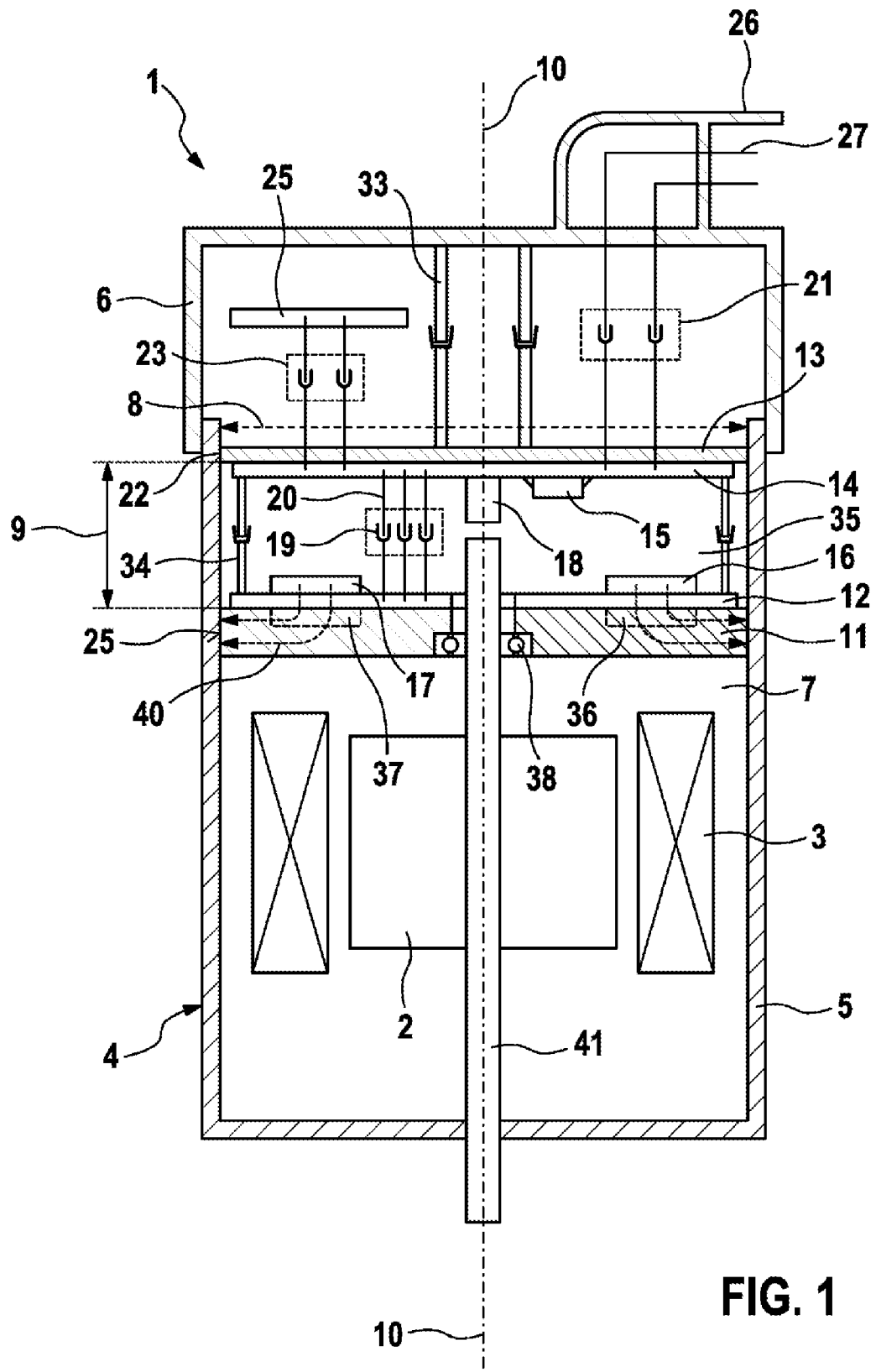
FIG. 1 shows an exemplary embodiment of an electrical machine, the electrical components of which are compactly combined in an assembly, wherein a cooling plate, for cooling a control unit, extends parallel to an end plate, and electrical components of the control unit are arranged in a cavity between the cooling plate and the end plate.

FIG. 1 shows an exemplary embodiment of a machine 1. The machine 1 has a rotor 2, in particular a permanent-magnet type rotor, and a stator 3, comprising stator coils. The machine 1 also has a housing 4, comprising a housing cup 5 and a housing cover 6. The housing cup 5 encloses a cavity 7, in which are accommodated the rotor 2, the stator 3 and an inverter for supplying current to the stator, as well as a control unit for controlling the inverter. In this exemplary embodiment, the inverter comprises a circuit carrier 12, to which power semiconductors 16 and 17, in particular semiconductor switches, for example field-effect transistors, are connected. In this exemplary embodiment, the control unit comprises a circuit carrier 14, to which a processing unit 15, in particular a microcontroller or a microprocessor, is connected for the purpose of electrically controlling the machine 1.

The machine 1 also comprises an end plate 11, which is accommodated in the cavity 7 and shrink-fitted into the housing cup 5. The machine 1 also comprises a cooling plate 13, which is accommodated in the cavity 7 and shrink-fitted into the housing cup 5. Both the end plate and the cooling plate 13 are thus connected in a thermally conductive manner in a thermally conductive manner—via an end face 22 of the cooling plate 13 and via an end face 25 of the end plate 11, respectively—to the housing cup 5.

The control unit, in particular components of the control unit that generate heat loss, such as the processing unit 15, is connected to the cooling plate 13 in a thermally conductive manner and can conduct the heat loss—through the circuit carrier 14—to the cooling plate 13.

In this exemplary embodiment, the inverter comprises a circuit carrier 12, for example a ceramic circuit carrier, that is connected in a thermally conductive manner to the end plate 11. The semiconductor switches 16 and 17 can thus conduct heat loss through the circuit carrier 12—in particular in a slug-down arrangement—to the end plate 11, from where the heat loss 40 can be transferred to the housing cup 5 via an end face 25 of the end plate 11.

In this exemplary embodiment, the end plate 11 has a recess for a rotor bearing 38, in which the rotor bearing 38 is arranged. In this exemplary embodiment, the rotor 2 comprises a rotor shaft 41 that projects through a through-hole in the end plate 11 and through a through-hole in the circuit carrier 12. In this exemplary embodiment, the circuit carrier 14 of the control unit and the circuit carrier 12 of the inverter enclose between them a portion 35 of the cavity 7 that extends on a longitudinal portion 9 along a longitudinal axis 10 of the machine 1. In this exemplary embodiment, the longitudinal axis 10 is coaxial with a longitudinal extent of the rotor shaft 41. In this exemplary embodiment, the control unit has a rotor-position sensor 18, in particular a Hall sensor, AMR sensor (AMR=Anisotrope-Magneto-Resistive) or GMR sensor (GMR=Giant-Magneto-Resistive), which is connected to the circuit carrier 14 and which is opposite an end of the rotor shaft 41, and can thus sense a rotor position of the rotor 2.

The electrical components, in particular electrical devices, connected to the circuit carriers 14 and 12 extend into the portion 35 of the cavity 7 formed on the longitudinal portion 9. The electrical components connected to the circuit carrier 12 of the inverter and the electrical components connected to the circuit carrier 14 of the control unit thus project—in particular along the longitudinal axis 10—in mutually opposite directions. In this exemplary embodiment, the circuit carriers 12 and 14 are mechanically connected to each other by means of web-shaped connection elements, of which one connection element 34 is denoted by way of example. The control unit, in particular the circuit carrier 14 of the control unit, is electrically connected to the circuit carrier 12, and thus to the inverter, by means of electrical connection lines. The inverter can thus receive control signals from the control unit, in particular from the processing unit 15, via the electrical connection lines. Of the electrical connection lines, one connection line 20 is denoted by way of example. The connection line 20 leads into a socket 19 that is electrically connected to the circuit carrier 12. The circuit carrier 14 can thus—together with the cooling plate 13—be plugged together for connection to the inverter.

For this purpose the connection element 34 is also realized as a plug-in element. The control unit and the inverter can thus be inserted as a pre-assembled, in particular plugged-together, assembly, into the cavity 7 of the housing cup 5, through a housing-cup opening 8.

In this exemplary embodiment, the control unit, in particular the circuit carrier 14, has plug-in connections, in particular plug-in sockets 21 and 23, facing the housing cover 6, which each project into a cavity enclosed by the housing cover 6. In this exemplary embodiment, the housing cover 6 has a plug-in connection 26 that is integrally formed on the housing cover 6 and that comprises plug-in contacts, of which one plug contact 27 is denoted by way of example. The plug-in contacts 27 are routed through the housing cover 6 into the cavity enclosed by the housing cover 6, where they can be inserted into the plug-in connection 21. In this exemplary embodiment, the cooling plate 13 is connected to the housing cover 6 by means of a mechanical, in particular separable, plug-in connection 33. The housing cover 6 can thus be easily plug-connected, both electrically and mechanically, to the circuit carrier 14 and the cooling plate 13. In this exemplary embodiment, a circuit carrier 25, in particular an EMC filter (EMC=electromagnetic compatibility), is electrically and mechanically connected to the plug-in connection 33.

The housing cup 6, following plug-in connection to the cooling plate 13 and to the circuit carrier 14 of the control unit, and following further plug-in connection of the circuit carrier 12 of the inverter to the control unit, in particular to the circuit carrier 14, can thus be inserted as a pre-assembled assembly into the cavity 7 of the housing cup 5, through the housing cup opening 8.

FIG. 2 shows a method step for connecting the end plate 11 represented in FIG. 1 to the housing cup 5. For this purpose, the housing cup 5 is heated by means of heat rays 29, on a longitudinal portion 28 along the longitudinal axis 10, from a point of connection 1 of the end plate 11 to the housing cup 5 up to a housing-cup rim of the housing cup 5. The housing cup 5 thus expands in this region along the longitudinal portion 28, such that after heating its diameter increases. The end plate 11 can then be inserted into the housing cup 5, in the region of the longitudinal portion 28, without friction. Following cooling of the housing cup 5 on the longitudinal portion 28, the housing cup 5, in particular the housing-cup wall, shrinks onto the end plate 11 and presses against end faces of the end plate 11, such that an interference fit can be produced.

FIG. 3 shows an exemplary embodiment of a method step for producing the machine 1 represented in FIG. 1. FIG. 3 shows a pre-assembled assembly 32, which the housing cover 6, the control unit plugged together with the housing cover 6, comprising the circuit carrier 14 and the cooling plate 13, and the inverter plug-connected to the control unit, comprising the circuit carrier 12. In this exemplary embodiment, power semiconductors, in particular semiconductor switches 36 and 37, which—in contrast to what is represented in FIG. 1—do not project into the cavity formed on the longitudinal portion 9 between the circuit carriers 12 and 14, but which extend out from the circuit carrier 12 of the inverter toward the end plate 11, are soldered to the circuit carrier 12 of the inverter. The semiconductor switches 36 and 37 are thus connected to the end plate 11 in a thermally conductive manner by means of a slug-up technique.

The end plate 11 represented in FIG. 2 is represented in FIG. 3 as an end plate 11' shrunk into the housing cup 5. A heat-conducting compound 30, in particular heat-conducting paste or heat-conducting adhesive, is applied—in particular opposite the semiconductor switches 36 and 37—to the end plate 11. The assembly 32 can thus be inserted through the housing-cup opening 8 into the housing cup 5, until the semiconductor switches 36 and 37 bear against the end plate 11. The housing cup 5 is then closed by the housing cover 6.

The housing cup 5, before being assembled with the assembly 32, may be heated by means of heat rays 29 on a longitudinal portion 31 extending from a point of connection of the cooling plate 13, along the longitudinal axis 10, to a housing-cup rim. The cooling plate 13, following insertion into the cavity 7 of the housing cup 5, may thus be shrunk into the housing cup 5, following cooling of the housing cup 5. In contrast to what is represented in FIG. 3, the cooling plate 13 may be pressed into the housing cup 5.

The invention claimed is:

1. An electrical machine, comprising:
   a housing;
   a control unit located in the housing, the control unit configured to control the electrical machine to generate a rotating magnetic field,
   wherein the housing has a housing cup that encloses a cavity, and has a housing cover,
   wherein the electrical machine has an end plate,
   wherein the end plate is accommodated in the housing cup and is connected in a thermally conductive manner to the housing cup,
   wherein the electrical machine has a cooling plate that is connected in a thermally conductive manner to the housing cup and to at least one component, or a plurality of components, of the control unit,
   wherein the electrical machine has an inverter comprising semiconductor switches,
   the semiconductor switches are connected in a thermally conductive manner to the end plate,
   wherein the end plate and the cooling plate enclose between them a portion of the cavity,
   wherein the control unit and the inverter are accommodated in the portion of the cavity, and
   wherein the cooling plate is shrink-fitted into the housing cup.

2. The electrical machine as claimed in claim 1, wherein the control unit and the inverter are each electrically connected to one another by at least one plug-in contact.

3. The electrical machine as claimed in claim 1, wherein:
   an end face of the cooling plate is connected in a thermally conductive manner to a housing-cup wall of the housing cup by a press connector.

4. The electrical machine as claimed in claim 1, wherein the housing cover is plug-connected to the cooling plate by a plug-in connector and/or connected in a latching manner by a latching connector.

5. The electrical machine as claimed in claim 3, wherein the cooling plate has projection regions on the end face and contacts the wall of the housing cup with the projection regions, by pressing against it.

6. The electrical machine as claimed in claim 1, wherein the housing cover, the cooling plate and the control unit are connected to each other, and together form an assembly that can be separably connected to the housing cup.

7. The electrical machine as claimed in claim 6, wherein the inverter is mechanically and electrically connected to the control unit and/or to the cooling plate and is part of the assembly.

8. A method for producing an electrical machine having a housing cup and a housing cover configured to close a housing opening of the housing cup, the method comprising:
   inserting an end plate into the housing cup;
   positively and/or non-positively connecting the inserted end plate to the housing cup in a thermally conductive manner; and
   inserting a cooling plate, a control unit, and an inverter connected to the control unit into the housing cup such that semiconductor switches of the inverter are connected to the end plate in a thermally conductive manner, and the cooling plate, which extends parallel to the end plate, is non-positively and/or positively connected in the housing cup in a thermally conductive manner.

9. The method as claimed in claim 8, wherein the control unit, the cooling plate, and the inverter form an assembly that is connected rigidly to the housing cover, such that, upon insertion of the assembly into the housing cup, the housing opening is closed.

10. The method as claimed in claim 9, wherein upon insertion of the assembly into the housing cup, the cooling plate is non-positively connected to the housing cup by pressing-in or shrink-fitting.

* * * * *